(12) United States Patent
Liang

(10) Patent No.: US 12,050,581 B2
(45) Date of Patent: Jul. 30, 2024

(54) METHOD AND APPARATUS FOR PROCESSING TABLE OF DOCUMENT, AND DEVICE AND MEDIUM

(71) Applicant: Beijing Zitiao Network Technology Co., Ltd., Beijing (CN)

(72) Inventor: Ruiyuan Liang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/397,877

(22) Filed: Dec. 27, 2023

(65) Prior Publication Data

US 2024/0126739 A1    Apr. 18, 2024

Related U.S. Application Data

(63) Continuation of application No. PCT/CN2022/134745, filed on Nov. 28, 2022.

(30) Foreign Application Priority Data

Dec. 2, 2021    (CN) .......................... 202111459218.X

(51) Int. Cl.
*G06F 16/00* (2019.01)
*G06F 16/22* (2019.01)
(Continued)

(52) U.S. Cl.
CPC .......... *G06F 16/2282* (2019.01); *G06F 16/93* (2019.01); *G06F 40/177* (2020.01)

(58) Field of Classification Search
CPC ..... G06F 16/2282; G06F 16/93; G06F 40/177
See application file for complete search history.

(56) References Cited

U.S. PATENT DOCUMENTS

| | | | |
|---|---|---|---|
| 2006/0282448 | A1 | 12/2006 | Schneider et al. |
| 2015/0026189 | A1* | 1/2015 | Li .......................... G06F 16/245 707/769 |

(Continued)

FOREIGN PATENT DOCUMENTS

| | | |
|---|---|---|
| CN | 110019279 A | 7/2019 |
| CN | 113095053 A | 7/2021 |

(Continued)

OTHER PUBLICATIONS

Jayapandian et al., "Automated Creation of a Forms-Based Database Query Interface," VLDB Endowment, ACM, 2008, pp. 695-709. (Year: 2008).*

(Continued)

*Primary Examiner* — Cheryl Lewis
(74) *Attorney, Agent, or Firm* — Astute IP Law Group

(57) ABSTRACT

This disclosure discloses a method and an apparatus for processing a table of a document, a device and a medium. The method includes: acquiring table information of a database table to be created and initiating, to a server, a table creation request for creating the database table in the current document in response to a table creation operation of a user for a current document; and in response to a database identifier associated with the current document returned by the server for the table creation request, creating the database table in the current document based on the database identifier and the table information.

20 Claims, 4 Drawing Sheets

Acquire table information of a database table to be created and initiate a table creation request to a server for creating the database table in the current document in response to a table creation operation of a user for a current document — S102

In response to the database identifier associated with the current document returned by the server for the table creation request, create the database table in the current document based on the database identifier and the table information — S104

(51) Int. Cl.
  *G06F 16/93*   (2019.01)
  *G06F 40/177*  (2020.01)

(56)  References Cited

U.S. PATENT DOCUMENTS

| | | | |
|---|---|---|---|
| 2015/0302049 A1* | 10/2015 | Wong | G06F 16/2358 |
| | | | 707/609 |
| 2020/0226117 A1 | 7/2020 | Mutalik Desai | |
| 2022/0004532 A1* | 1/2022 | Portisch | G06F 16/2282 |
| 2023/0401377 A1* | 12/2023 | Chen | G06F 3/0481 |

FOREIGN PATENT DOCUMENTS

| | | | |
|---|---|---|---|
| CN | 113287100 A | 8/2021 | |
| CN | 114154469 A | 3/2022 | |

OTHER PUBLICATIONS

Cosmin Stoica Spahiu, "A Multimedia Database Server For Information Storage and Querying," Proceedings of the International Multiconference on Computer Science and Information Technology, pp. 517-522, IEEE, 2009. (Year: 2009).*
International Search Report in PCT/CN2022/134745, mailed Jan. 28, 2023, 4 pages.
Written Opinion in PCT/CN2022/134745, mailed Jan. 28, 2023, 4 pages.

* cited by examiner

METHOD AND APPARATUS FOR PROCESSING TABLE OF DOCUMENT, AND DEVICE AND MEDIUM

CROSS-REFERENCE TO RELATED APPLICATIONS

The present application is a continuation of International Application No. PCT/CN2022/134745 filed on Nov. 28, 2022, which claims the benefit to the Chinese Patent Application No. 202111459218.X filed on Dec. 2, 2021. All the aforementioned patent applications are hereby incorporated by reference in their entireties.

TECHNICAL FIELD

The present disclosure relates to the technical field of data processing, and in particular, to a method and an apparatus for processing a table of a document, a device and a medium.

BACKGROUND

In most text-editable documents in the related art, a user can not only input text, but also draw a table, such as a table with N rows and M columns, which is used only for simple input and presentation of data, as required.

SUMMARY

Embodiments of the present disclosure provide a method for processing a table of a document, which is applied to a client, comprising: acquiring table information of a database table to be created and initiating, to a server, a table creation request for creating the database table in the current document in response to a table creation operation of a user for a current document; and in response to a database identifier associated with the current document returned by the server for the table creation request, creating the database table in the current document based on the database identifier and the table information.

In some embodiments, the creating the database table in the current document based on the database identifier and the table information comprises: initiating a request for acquiring a table identifier to the server based on the database identifier and the table information; and in response to the table identifier returned by the server for the request for acquiring the table identifier, storing the table identifier and the database identifier in association in a data structure corresponding to the current document; and rendering and displaying the database table on the current document based on the table information.

In some embodiments, the acquiring table information of a database table to be created and initiating, to a server, a table creation request for creating the database table in the current document in response to a table creation operation of a user for a current document comprises: acquiring the table information of the database table to be created through a first document processing end in response to the table creation operation of the user for the current document, and sending a request to a first database table processing end to acquire the database identifier associated with the current document; and initiating the table creation request for creating the database table in the current document to a second database table processing end through the first database table processing end to acquire the database identifier, the database identifier being returned by the second database table processing end for the table creation request and being associated with the current document.

In some embodiments, the initiating the request for acquiring the table identifier to the server based on the database identifier and the table information comprises: initiating the request for acquiring the table identifier to a second database table processing end through a first database table processing end based on the database identifier and the table information to acquire the table identifier returned by the second database table processing end.

In some embodiments, the storing the table identifier and the database identifier in association in a data structure corresponding to the current document comprises: associating the table identifier with the database identifier through a first document processing end in response to the table identifier sent from the first database table processing end; and sending an association result to a second document processing end for the second document processing end to store the association result in the data structure corresponding to the current document.

In some embodiments, the rendering and displaying the database table on the current document based on the table information comprises: rendering the database table through a first database table processing end based on the table information and the database identifier; and presenting the rendered database table on an interface of the current document through the first document processing end.

The embodiments of the present disclosure further provide a method for processing a table of a document, which is applied to a server, comprising: acquiring a database identifier associated with a current document in response to a table creation request initiated by a client for creating a database table in the current document; and returning the database identifier to the client for the client to create the database table in the current document based on the database identifier and table information of the database table, wherein the table information is acquired by the client based on a table creation operation of a user for the current document.

In some embodiments, the acquiring the database identifier associated with the current document comprises: inquiring whether the current document is associated with an existing database; in response to the current document being associated with the existing database, taking an identifier of the existing database as the database identifier associated with the current document; and in response to the current document not being associated with the existing database, creating a new database, and taking an identifier of the new database as the database identifier associated with the current document.

In some embodiments, the method further comprises: returning a table identifier to the client in response to a request for acquiring the table identifier initiated by the client based on the database identifier and the table information for the client to store the table identifier and the database identifier in association in a data structure corresponding to the current document by the client and to render and present the database table on the current document based on the table information by the client.

In some embodiments, the acquiring the database identifier associated with the current document in response to the table creation request initiated by the client for creating the database table in the current document comprises: in response to the table creation request for creating the database table in the current document initiated by a first database table processing end, acquiring the database identifier associated with the current document through a second database table processing end; and the returning the database identifier to the client comprises: returning the database identifier to a first database table processing end through the second database table processing end.

In some embodiments, the returning the table identifier to the client in response to the request for acquiring the table identifier initiated by the client based on the database identifier and the table information comprises: receiving, through a second database table processing end, the request for acquiring the table identifier initiated by a first database table processing end based on the database identifier and the table information; and returning the table identifier corresponding to the request for acquiring the table identifier to the first database table processing end for the first database table processing end to return the table identifier to a first document processing end.

In some embodiments, the method further comprises: receiving an association result of the table identifier and the database identifier from a first document processing end through a second document processing end; and storing the association result into the data structure corresponding to the current document.

In some embodiments, the client comprises a first document processing end and a first database table processing end; and the server comprises a second document processing end and a second database table processing end.

In some embodiments, the table information comprises at least one of information for setting a table format, or a view presentation form.

In some embodiments, the created database table has database functions comprising at least one of structured storage, Structured Query Language query, or operation on data.

The embodiments of the present disclosure further provide an apparatus for processing a table of a document, which is applied to a client, comprising: a client response module configured to acquire table information of a database table to be created in response to a table creation operation of a user for a current document, and initiate, to a server, a table creation request for creating the database table in the current document; and a client table creation module configured to, in response to a database identifier associated with the current document returned by the server for the table creation request, create the database table in the current document based on the database identifier and the table information.

The embodiments of the present disclosure further provide an apparatus for processing a table of a document, which is applied to a server, comprising: a server response module configured to acquire a database identifier associated with a current document in response to a table creation request initiated by a client for creating a database table in the current document; a server table creation module configured to return the database identifier to the client for the client to create the database table in the current document based on the database identifier and table information of the database table, wherein the table information is acquired by the client based on a table creation operation of a user for the current document.

The embodiments of the present disclosure further provide an electronic device, comprising: a processor; and a memory configured to store instructions executable by a processor; the processor, configured to read the executable instructions from the memory and execute the instructions to implement the method for processing a table of a document provided by the embodiments of the present disclosure.

The embodiments of the present disclosure further provide a non-transitory computer-readable storage medium having thereon stored a computer program, for executing the method for processing a table of a document provided by the embodiments of the present disclosure.

The embodiments of the present disclosure further provide a computer program, comprising: instructions, which, when executed by a processor, cause the processor to execute the method for processing a table of a document provided by the embodiments of the present disclosure.

It should be understood that the statements in this section are not intended to identify key or critical features of the embodiments of the present disclosure, nor are they intended to limit the scope of the present disclosure. Other features of the present disclosure will become apparent from the following description.

BRIEF DESCRIPTION OF THE DRAWINGS

The accompanying drawings, which are incorporated in and constitute a part of this specification, illustrate the embodiments consistent with the present disclosure and, together with the description, serve to explain the principles of the present disclosure.

In order to more clearly illustrate the embodiments of the present disclosure or technical solutions in the prior art, the drawings used in the description of the embodiments or technical solutions in the prior art will be briefly described below, and it is obvious for those skilled in the art that other drawings can be obtained according to these drawings without paying out any creative effort.

DETAILED DESCRIPTION

In order that the above objects, features and advantages of the present disclosure may be more clearly understood, solutions of the present disclosure will be further described below. It should be noted that, in the case of no conflict, the embodiments of the present disclosure and features in the embodiments may be combined with each other.

In the following description, numerous specific details are set forth in order to provide thorough understanding of the present disclosure, but the present disclosure may be implemented otherwise than as described herein; apparently, the embodiments disclosed in the specification are only a part but not all of the embodiments of the present disclosure.

In mostly of text-editable documents such as Word documents and most online collaborative documents, it is difficult to directly access a database table, and only a simple data table can be locally inserted. Such a table has a single function, and is only used for inputting and displaying data in cells, does not have capabilities of a table in a database. For example, such a table does not have database functions such as structured storage, SQL query and operation on data of the database table, and is poor in data management capability of the document. On the other hand, a user cannot directly and flexibly associate a document with a database table, and can only export data in the database to form a document, which is complex and poor in flexibility. In addition, a document format formed by exporting the table data in the database is limited, so it is difficult to meet flexible editing requirements of a user who not only wants to edit paragraph text in the document and but also wants to insert tables in other positions in the document, and the richness of document functions is correspondingly poor. In order to improve or partially improve at least one of the above problems, embodiments of the present disclosure provide a method and apparatus for processing a table of a document, a device and a medium, where the document in the embodiments of the present disclosure may be, for example, a Word document, or an online collaborative document, which is described in detail below.

Figure 1:
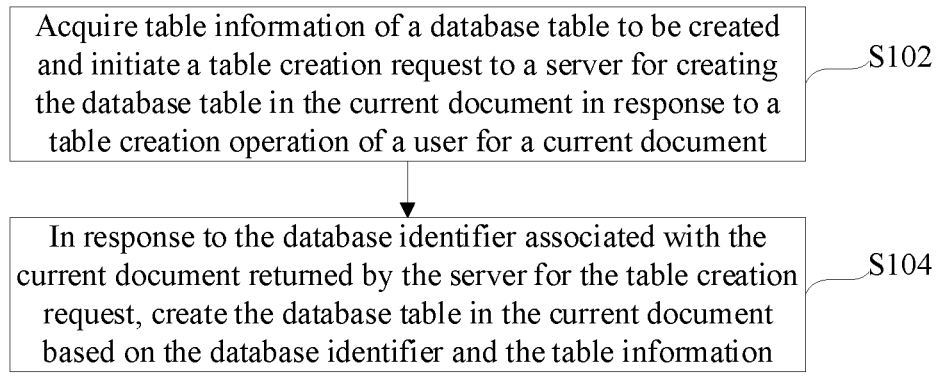
FIG. 1 is a flowchart illustrating a method for processing a table of a document, which is applied to a client, according to an embodiment of the present disclosure.

First, the embodiments of the present disclosure provide a method for processing a table of a document from the perspective of a client, which may be applied to a client, wherein the client may be implemented by at least one of software or hardware, and may be, for example, a user equipment such as a computer or a mobile phone. FIG. 1 is a flowchart illustrating a method for processing a table of a document, which is applied to a client, according to an embodiment of the present disclosure, and as shown in FIG. 1, the method mainly comprises the following steps S102 to S104.

In Step S102, table information of a database table to be created is acquired and a table creation request is initiated to a server for creating the database table in the current document in response to a table creation operation of a user for a current document.

It can be understood that, a user may perform the table creation operation on the current document via a preset table creation component, wherein the table creation operation indicates the table information of the table to be created, and the table information comprises, but is not limited to, information for setting a format of the table, for example, information for setting the table to be M rows and N columns (M and N both are positive integers), or the table information may further comprise a view presentation form of the table to be created, and the like, and the table creation operation is not limited in the embodiments of the present disclosure. The client can acquire the table information based on the table creation operation and initiate the table creation request to the server. It should be noted that, the time sequence between acquiring the table information and initiating the table creation request is not limited in the embodiments of the present disclosure.

In addition, in practical applications, when receiving the table creation operation of a user for the current document, the client may locally create a database table placeholder and display a loading state, and then request the server for a database identifier, wherein the request for the database identifier may be regarded as the table creation request for creating the database table in the current document.

In Step S104, in response to the database identifier associated with the current document returned by the server for the table creation request, the database table is created in the current document based on the database identifier and the table information. The database identifier may also be referred to as database table flag information, or a database token flag.

In practical applications, the server records an correlation between a document and a database, and after the client acquires the database identifier associated with the current document returned by the server, the client can create a database table, render and present the database table on the current document, and the database table is also associated with the database corresponding to the database identifier. Specifically, the database table is a table in the database associated with the current document. When the client renders and presents the database table, an interface of a database table front end can be called to request to mount the database table, the database table front end, after receiving a mounting request, can retrieve and load the table information of the database table, the database table front end, after retrieving the table information, can render the whole database component, and mount the database table, so that the database table is presented on the current document.

It should be noted that, in the embodiments of the present disclosure, a table is not created on a document directly based on the table information in a traditional manner, but by means of interactions between the client and the server, only after the server returns the database identifier associated with the current document, the table is further created in the current document based on the database identifier and the table information, and the table is directly related to the database and is essentially a database table.

In this way, by means of the interactions between the client and the server, the database table can be directly accessed (or embedded) in the document, and the database table is related to the database associated with the current document, which helps to further enable the accessed table in the document to have the database-related functions, and effectively enhances the functionality of the table. For example, the accessed database table has database functions such as structured storage, SQL query and operation on data, which also enables the document to have stronger data management capabilities. In addition, in this way, the user can directly access the database table in documents such as word documents or online collaborative documents according to his own needs; in addition, the user can also flexibly edit other contents in the documents, such as text editing, chart insertion in an area outside the database table, which is more flexible compared with the user directly exporting the table from the database.

When the client creates the database table in the current document based on the database identifier and the table information, the following steps (1) to (2) may be referred to.

(1) Initiate a request for acquiring the table identifier to the server based on the database identifier and the table information. In some embodiments, the client may construct a table data structure based on the database identifier and the table information, the table data structure relating to both the table information (the user's table creation operation) and the database with which the current document is associated; and then, initiate the request for acquiring the table identifier to the server based on the constructed table data structure, in other words, initiate the request for acquiring the table identifier corresponding to the table data structure to the server or initiate the request for acquiring the table identifier carrying the table data structure to the server, and only after receiving the table identifier of the database table to be created, which is returned by the server, can the database table be confirmed to be created. Or, the client may directly send a request playload of the table data structure to the server (which is equivalent to sending the request for acquiring the table identifier), and the server may directly construct the database table based on the table data structure and return the table identifier of the database table to the client, so that the client updates data of the document and mounts the database table based on the table identifier.

(2) In response to the table identifier returned by the server for the request for acquiring the table identifier, store the table identifier and the database identifier in association in a data structure corresponding to the current document, and render and display the database table on the current document based on the table information.

The table identifier (also referred to as Table ID) is an identifier of the table under the database associated with the current document, and the server may return the table identifier for the request for acquiring the table identifier. In some embodiments, after acquiring the table identifier, the client may store the table identifier and the database identifier in association in a data structure corresponding to the current document. This step is to update the data structure corresponding to the current document, wherein the data structure records data comprised in the document. Through associating and updating the table identifier and the database identifier to the data structure of the document, data synchronization of the database table accessed to the document can be achieved. In addition, the database table may be presented visually on the interface of the current document through database table rendering and presentation on the current document based on the table information.

In other embodiments, the client may also directly carry the database identifier and the table information in the initiated request for acquiring the table identifier, so as to construct and store the database table based on the table information and the database identifier through the server (such as a database table back end), so that the client may subsequently obtain the information of the database table directly from the server and perform rendering and presentation. The above process as a whole may be regarded as creating the database table in the current document based on the database identifier and the table information.

Figure 2:
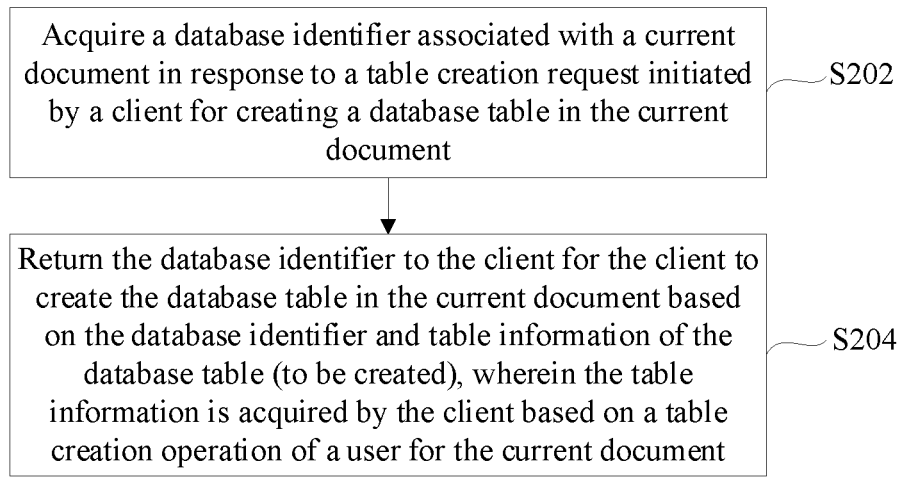
FIG. 2 is a flowchart illustrating a method for processing a table of a document, which is applied to a server, according to an embodiment of the present disclosure.

In addition, the embodiments of the present disclosure provide a method for processing a table of a document from the perspective of a server, which may be applied to a server, wherein the server may be implemented by at least one of software or hardware, such as a server. FIG. 2 is a flowchart illustrating a method for processing a table of a document, which is applied to a server, according to an embodiment of the present disclosure, and the method mainly comprises the following steps S202 to S204.

In Step S202, a database identifier associated with a current document is acquired in response to a table creation request initiated by a client for creating a database table in the current document.

In Step S204, the database identifier is returned to the client for the client to create the database table in the current document based on the database identifier and table information of the database table (to be created), wherein the table information is acquired by the client based on a table creation operation of a user for the current document.

For the related content of the above manner, reference may be made to the related description of the method for processing a table of a document from the perspective of a client, which is not described herein again. By means of the interactions between the client and the server, the database table can be directly accessed into the document, and the database table is related to the database associated with the current document, which helps to further enable the accessed table in the document to have the database-related functions, and effectively enhances the functionality of the table.

In addition, in some embodiments, the server may obtain the table data structure (constructed based on the database identifier and the table information) through the client, construct and store the database table to be created based on the table data structure, and then the client may retrieve the database table from the server and perform rendering and mounting. The above process as a whole may also be regarded as the client creating the database table.

When the server acquires the database identifier associated with the current document, it can inquire whether the current document is associated with an existing database; in response to the current document being associated with the existing database, an identifier of the existing database is taken as the database identifier associated with the current document; in response to the current document not being associated with the existing database, a new database is created, and an identifier of the new database is taken as the database identifier associated with the current document.

In some embodiments, each document may be associated with at most one database, but there may be multiple tables under the database. In other words, each document may have access to multiple database tables, which all correspond to the same one database, and the database is the database associated with the current document; different database tables accessed in the current document have different table identifiers, but has the same associated database identifier. On this basis, after the client initiates the table creation request for creating the database table in the current document to the server, the server will first search for a database associated with the current document (in other words, inquiring an association between the document and the database); in a case where the database is found, the identifier of the database is returned to the client, and in a case where the database is not found, it indicates that the current document has no database associated therewith, and at this time, a database may be newly created for the current document, and the identifier of the newly created database is returned to the client.

Further, the above method further comprises: returning the table identifier to the client in response to the request for acquiring the table identifier initiated by the client based on the database identifier and the table information, so that the client can store the table identifier and the database identifier in association in the data structure corresponding to the current document by the client, and render and present the database table on the current document based on the table information by the client. In practical application, the client may first associate the table identifier with the database identifier, and store and record an association result in the data structure corresponding to the current document through the server, and the client can directly present the database table on the document interface based on the table information.

Figure 3:
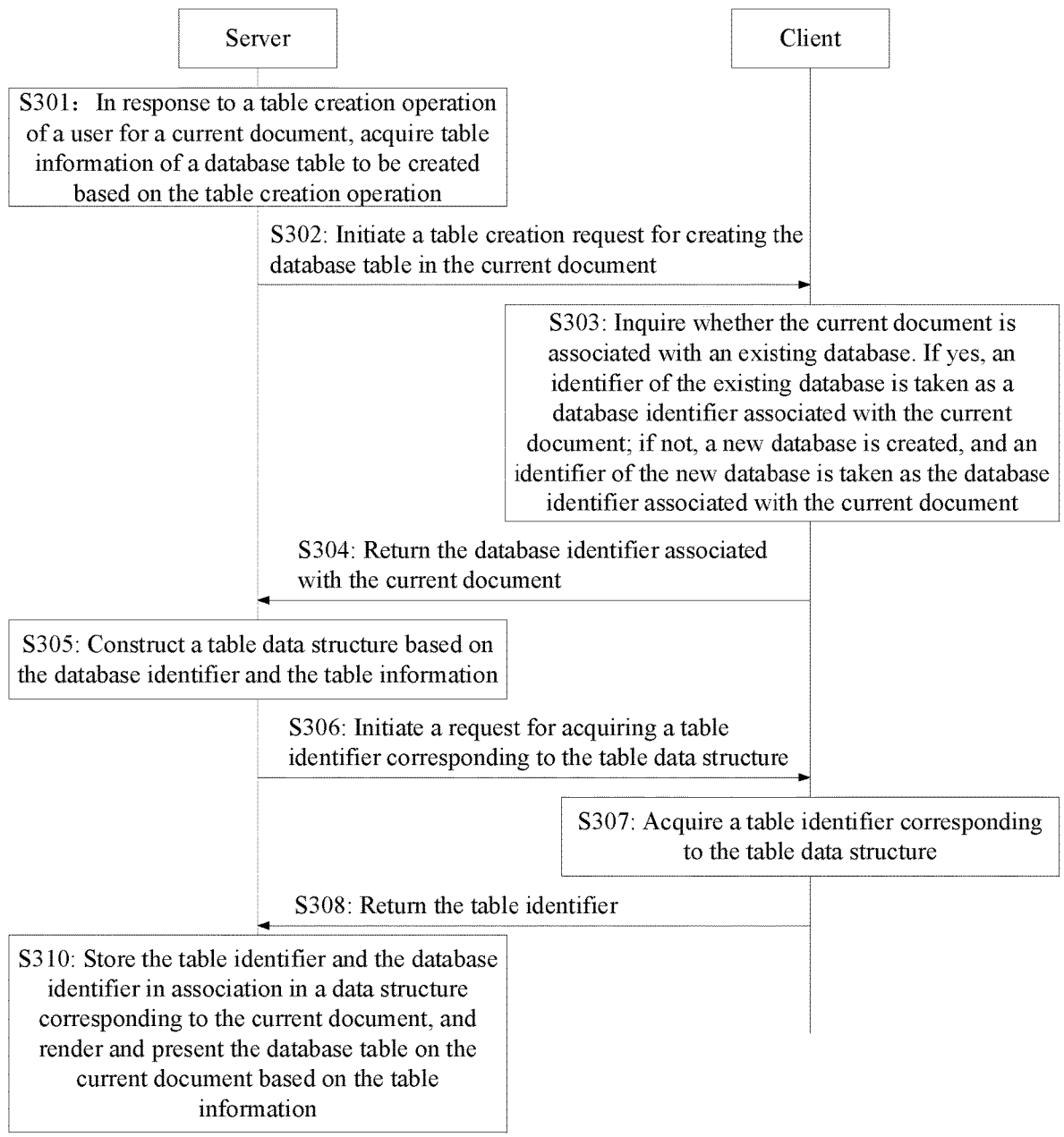
FIG. 3 is an interaction flowchart of a method for processing a table of a document, according to an embodiment of the present disclosure.

For convenience of understanding, the embodiments of the present disclosure further provide a method for processing a table of a document, which illustrates an interaction process between a client and a server, and in particular, an interaction flowchart of a method for processing a table of a document is shown in FIG. 3, where main steps of the interaction are described below.

In Step S301, a client, in response to a table creation operation of a user for a current document, acquires table information of a database table to be created based on the table creation operation.

In Step S302, the client initiates, to a server, a table creation request for creating the database table in the current document.

In Step S303, the server inquires whether the current document is associated with an existing database. If yes, an identifier of the existing database is taken as a database identifier associated with the current document; if not, a new database is created, and an identifier of the new database is taken as the database identifier associated with the current document.

In Step S304, the server returns the database identifier associated with the current document to the client.

In Step S305, the client constructs a table data structure based on the database identifier and the table information.

In Step S306, the client initiates a request for acquiring a table identifier corresponding to the table data structure to the server.

In Step S307, the server acquires a table identifier corresponding to the table data structure. In some embodiments, the server may store the table data structure and construct a corresponding database table itself, based on the request for acquiring the table identifier corresponding to the table data structure, and set the table identifier corresponding to the database table.

In Step S308, the server returns the table identifier to the client.

In Step S310, the client stores the table identifier and the database identifier in association in a data structure corresponding to the current document, and renders and presents the database table on the current document based on the table information.

The detailed implementation of the above steps and the achievable technical effects can also refer to the above-mentioned related contents and will not be described herein again. It should be noted that FIG. 3 is only an application example and should not be considered as a limitation, and in an actual application, more or fewer steps than FIG. 3 may be adopted to enable the client and the server to interact, so as to realize the database table access to the document.

For convenience of understanding, the embodiments of the present disclosure further provide a specific implementation of a method for processing a table of a document. In this example, a client is divided into a document front end (also referred to as a first document processing end) and a database table front end (also referred to as a first database table processing end), and the database table front end may also be referred to as a database front end (or a first database processing end) for short. The document front end may be a document application program and the database table front end may be a database table application component. A server may be further divided into a document back end (also referred to as a second document processing end) and a database table back end (also referred to as a second database table processing end), and the database table back end may also be referred to as a database back end (or a second database processing end) for short. The document back end may be a document processing program, and the database table back end may be a database table processing program. In some embodiments, the database table back end stores correlations between each document and each database and information of the each database, such as all relevant information of the database, e.g. data structure information. The database table back end can provide data support of the database (database information for short) for the database table front end, and can also store the database table corresponding to the table creation operation of the user. The database table front end can render the database table based on the table information corresponding to the table creation operation and the database information (or render the database table directly based on the information of the constructed database table provided by the database table back end). Through interactions between the document front end and the database table front end, the document front end can mount and present the database table finally, so as to reach the effect of accessing (embedding) the database table into the document. In addition, by means of the interactions between the document front end and the document back end, the document back end can also update and store the database identifier and table identifier updates in the document data, or the document back end can record and store document data associated with the database table. In some specific embodiments, various roles are described below for ease of understanding.

(I) The core operations of the document front end and the database table front end are explained from the perspective of the client as follows:

the document front end is used for, in response to a table creation operation of a user for a current document, send a request to the database table front end to acquire a database identifier associated with the current document;

the database table front end is used for initiating, to a database table back end, a table creation request for creating a database table in the current document, so as to acquire a database identifier that is returned by the database table back end for the table creation request and is associated with the current document; the database table front end is also used for acquiring table information of the database table to be created based on the table creation operation, and rendering the database table on the current document based on the database identifier and the table information;

the database table front end is also used for initiating a request for acquiring a table identifier to the database table back end based on the database identifier and the table information, so as to acquire the table identifier returned by the database table back end and return the table identifier to the document front end;

the document front end is used for presenting the rendered database table on an interface of the current document, and is also used for associating the table identifier with the database identifier and sending an association result to the document back end, so that the document back end stores the association result into a data structure corresponding to the current document.

On the basis of the foregoing, for convenience of understanding, the interaction between the client and the server is described in different expression manners, and the following key steps A to D executed by the client are mainly explained.

Key step A: the step of acquiring the table information of the database table to be created and initiating, to the server, the table creation request for creating the database table in the current document in response to the table creation operation of the user for the current document may be performed as follows:

acquiring the table information of the database table to be created through the first document processing end (namely, the document front end) in response to the table creation operation of the user for the current document, and sending the request to the first database table processing end (namely, the database table front end) to acquire the database identifier associated with the current document;

initiating the table creation request for creating the database table in the current document to the second database table processing end (namely, the database table back end) through the first database table processing end to acquire the database identifier, the database identifier being returned by the second database table processing end for the table creation request and being associated with the current document.

Key step B: the step of initiating the request for acquiring the table identifier to the server based on the database identifier and the table information may be performed as follows:

initiating the request for acquiring the table identifier to the second database table processing end through the first database table processing end based on the database identifier and the table information to acquire the table identifier returned by the second database table processing end. In some embodiments, as in the implementation of the step A above, the first database table processing end acquires the database identifier returned by the second database table processing end, and then, may further send the request to the second database table processing end to acquire the table identifier based on the database identifier and the table information.

Key step C: the step of storing the table identifier and the database identifier in association in a data structure corresponding to the current document may be performed as follows:

associating the table identifier with the database identifier through the first document processing end in response to the table identifier sent from the first database table processing end; and sending an association result to the second document processing end for the second document processing end to store the association result in the data structure corresponding to the current document. In some embodiments, as in the implementation of the step B above, after the first database table processing end acquires the table identifier, the table identifier may be sent to the first document processing end, and the first document processing end may further send the table identifier and the database identifier in association to the second document processing end, so that the second document processing end updates the data structure of the current document.

Key step D: the step of rendering and displaying the database table on the current document based on the table information may be performed as follows:

rendering the database table through the first database table processing end based on the table information and the database identifier; and presenting the rendered database table on an interface of the current document through the first document processing end. In a case where the first database table knowing the table information and the database identifier, the first database table can render the database table to be created, and the first document processing end displays the rendered database table.

The above are specific examples only and should not be considered as limitations. In addition, the above steps A to D are only labels of different steps, and should not be regarded as limitations of time sequence or importance degree.

(II) The document back end and the database table back end are explained from the perspective of the server as follows:

the database table back end is used for acquiring the database identifier associated with the current document according to the table creation request sent from the database table front end, and returning the database identifier to the database table front end, so that the database table front end creates the database table in the current document based on the database identifier and the table information and returns the database identifier to the document front end;

the database table back end is also used for receiving the request for acquiring the table identifier initiated by the database table front end based on the database identifier and the table information, and returning the table identifier corresponding to the request for acquiring the table identifier to the database table front end, so that the database table front end returns the table identifier to the document front end;

the document back end is used for receiving the association result of the table identifier and the database identifier sent from the document front end and storing the association result into the data structure corresponding to the current document.

On the basis of the foregoing, for convenience of understanding, the interaction between the client and the server is described in different expression modes, and the following key steps E to H executed by the server are mainly explained.

Key step E: the step of acquiring the database identifier associated with the current document in response to the table creation request initiated by the client for creating the database table in the current document may be performed as follows:

in response to the table creation request for creating the database table in the current document initiated by the first database table processing end (namely, a database table front end), acquiring the database identifier associated with the current document through a second database table processing end (namely, a database table back end). That is, the database table front end sends the table creation request to the database table back end, and the database table back end acquires the database identifier associated with the current document.

Key step F: the step of returning the database identifier to the client may be performed as follows:

returning the database identifier to the first database table front end through the second database table processing end. In some embodiments, as in the implementation of the step E above, the second database table processing end acquires the database identifier, and can return the database identifier to the first database table front end at this time.

Key step G: the step of returning the table identifier to the client in response to the request for acquiring the table identifier initiated by the client based on the database identifier and the table information may be performed as follows:

receiving, through a second database table processing end, the request for acquiring the table identifier initiated by the first database table processing end based on the database identifier and the table information; and returning the table identifier corresponding to the request for acquiring the table identifier to the first database table processing end for the first database table processing end to return the table identifier to a first document processing end. In some embodiments, as in the implementation of the step F above, the first database table processing end acquires the database identifier and the table information, and then may further acquire the table identifier through the second database table processing end, so as to return the table identifier to the first document processing end.

Key step H: receiving, through the second document processing end, the association result of the table identifier and the database identifier sent from the first document processing end, and storing the association result into the data structure corresponding to the current document. In some embodiments, as in the implementation of the step G above, the first document processing end acquires the table identifier through the first database table processing end, and further associates the table identifier with the database identifier, and sends the association result to the second document processing end, so that the second document processing end stores the association result into the data structure corresponding to the current document.

The above are specific examples only and should not be considered as limitations. In addition, the above steps E to H are only labels of different steps, and should not be regarded as limitations of time sequence or importance degree.

Figure 4:
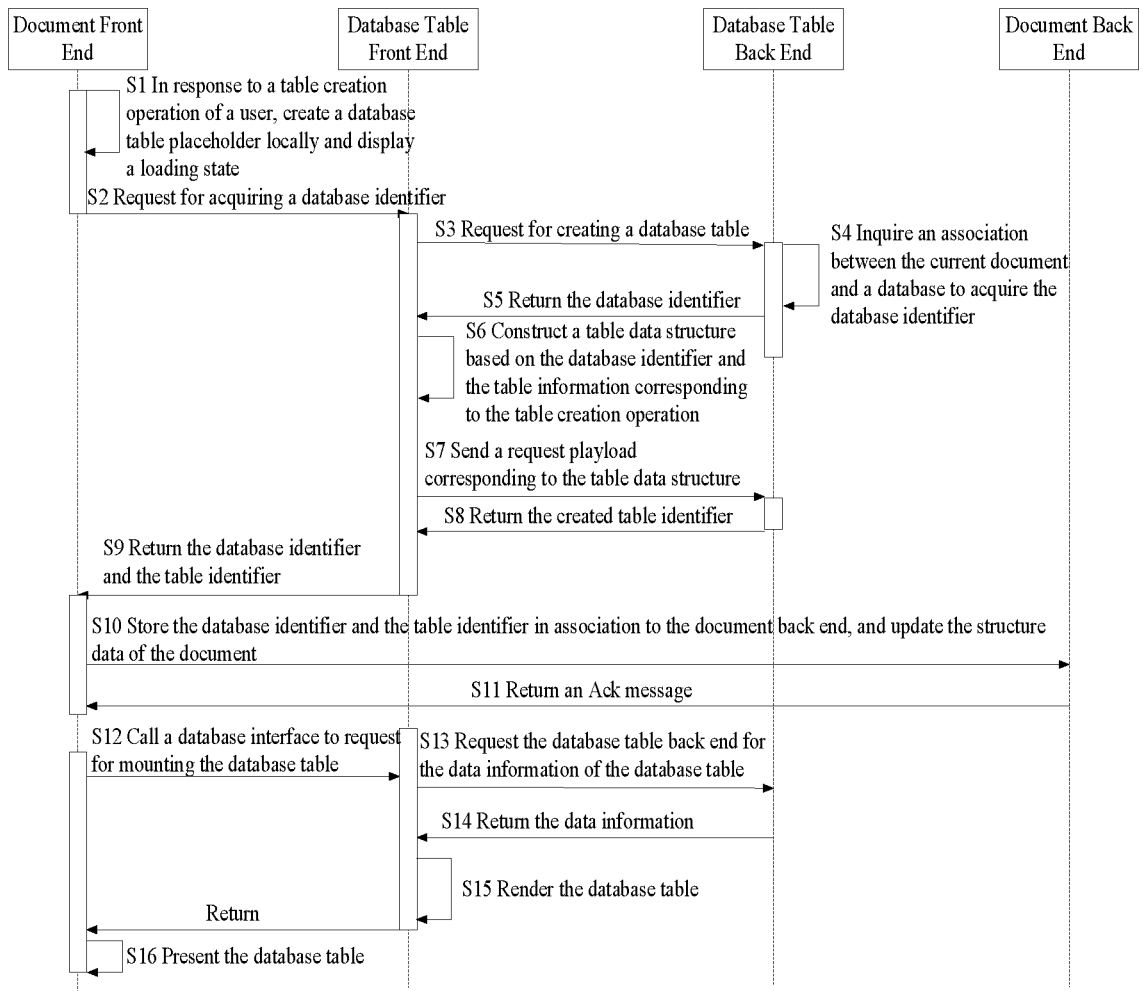
FIG. 4 is an interaction flowchart of another method for processing a table of a document, according to an embodiment of the present disclosure.

On the basis of the foregoing, an interaction flowchart of another method for processing a table of a document as shown in FIG. 4 is provided in the embodiments of the present disclosure, which illustrates interaction steps of a document front end, a database table front end, a document back end, and a database table back end, comprising S1 to S16.

In Step S1, the document front end, in response to a table creation operation of a user, creates a database table placeholder locally, and displays a loading state.

In Step S2, the document front end requests the database table front end for acquiring a database identifier, wherein the database identifier can be referred to as database table flag information.

In Step S3, the database table front end requests the database table back end for creating a database table.

In Step S4, the database table back end inquires an association between the current document and a database to acquire the database identifier.

In Step S5, the database table back end returns the database identifier to the database table front end.

In Step S6, the database table front end constructs a table data structure based on the database identifier and the table information corresponding to the table creation operation.

In Step S7, the database table front end sends a request playload corresponding to the table data structure to the database table back end. In some example implementations, the database table front end may request the constructed request playload to the database table back end through a short chain, to request for the table identifier (ID of a new table corresponding to the table creation operation).

In Step S8, the database table back end returns the created table identifier, i.e. ID of the table under the database associated with the current document, to the database table front end. In some embodiments, after receiving the request playload, the database table back end may directly construct a database table corresponding to the table data structure, assign a table identifier to the database table, and return the table identifier to the database table front end.

In Step S9, the database table front end returns the database identifier and the table identifier to the document front end.

In Step S10, the document front end stores the database identifier and the table identifier in association to the document back end, and updates the structure data of the document.

In Step S11, the document back end returns an Ack message (i.e., an acknowledgement message) to the document front end.

In Step S12, the document front end calls a database interface to request for mounting the database table. Specifically, the document front end calls the interface of the database front end to request for mounting the database table after waiting for the document back end to perform the Step S11.

In Step S13, the database table front end requests the database table back end for the data information of the database table; after receiving the mounting request, the database table front end can try to retrieve the data information of the current database table and load the data information. In some embodiments, the data information of the database table to be created may be created and stored in the database associated with the current document based on the table data structure by the database table back end.

In Step S14, the database table back end returns the data information to the database table front end.

In Step S15, the database table front end renders the database table. In particular, it can also be understood that the entire database component is rendered.

In Step S16, the document front end presents the database table. This step may also be understood as the current document mounting the database table, which is successfully embedded into the current document.

The above manner illustrates the interaction flow between the document front end, the database table front end, the document back end and the database table back end, and it should be noted that FIG. 4 is only a simple example illustrating the main interaction steps, and should not be considered as limitations, and in practical applications, it may be implemented by more or fewer steps than the steps illustrated in FIG. 4.

By use of the above methods for processing a table of a document provided by the embodiments of the present disclosure, a document can directly be accessed to a database table, and the database table is related to the database associated with the current document, which helps to further enable the accessed table in the document to have database-related functions, and effectively enhances the functionality of the table. For example, the accessed database table has database functions such as structured storage, SQL query and operation on data, and the document is also enabled to have stronger data management capabilities. In addition, in this way, a user can directly access the database table in documents such as word documents or online collaborative documents according to his own needs. In addition, the user can also flexibly edit other contents in the documents, such as text editing, chart insertion in an area outside the database table, which is more flexible compared with the user directly exporting a table from the database. Furthermore, the embodiments of the present disclosure can be well applied to online collaborative documents, after the database table is accessed to the online collaborative document, it is convenient for multiple persons to edit the database table of the online collaborative document, and the data information of the database table can be stored in a background database through the interaction between the client and the server, which greatly improves the convenience.

Figure 5:
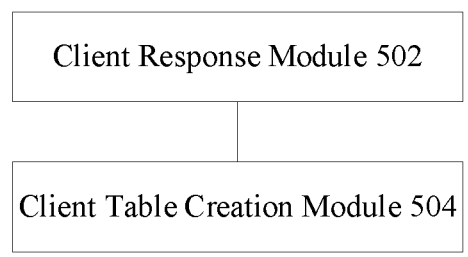
FIG. 5 is a schematic structural diagram of an apparatus for processing a table of a document, which is applied to a client, according to an embodiment of the present disclosure.

In correspondence to the above methods for processing a table of a document, the embodiments of the present disclosure provide an apparatus for processing a table of a document, which is applied to a client, and a schematic structural diagram of an apparatus for processing a table of a document, which is applied to a client, is shown in FIG. 5. the apparatus can be implemented by software and/or hardware, and can be generally integrated in an electronic device (such as a mobile phone or a computer) that can serve a client, and comprises:

- a client response module 502 configured to acquire table information of a database table to be created and initiating, to a server, a table creation request for creating the database table in the current document in response to a table creation operation of a user for a current document; and
- a client table creation module 504 configured to, in response to a database identifier associated with the current document returned by the server for the table creation request, create the database table in the current document based on the database identifier and the table information.

The apparatus can directly access the database table in the document through interactions between the client and the server, and the database table is related to the database associated with the current document, which helps to further enable the table accessed in the document to have database-related functions, and effectively enhances the functionality of the table.

In some embodiments, the client table creation module is specifically configured to initiate a request for acquiring a table identifier to the server based on the database identifier and the table information; in response to the table identifier returned by the server for the request for acquiring the table identifier, store the table identifier and the database identifier in association in a data structure corresponding to the current document; and render and display the database table on the current document based on the table information.

In some embodiments, the client response module is specifically configured to: acquire the table information of the database table to be created through a first document processing end in response to the table creation operation of the user for the current document, and send a request to a first database table processing end to acquire the database identifier associated with the current document; and initiate the table creation request for creating the database table in the current document to a second database table processing end through the first database table processing end to acquire the database identifier, the database identifier being returned by the second database table processing end for the table creation request and being associated with the current document.

In some embodiments, the client table creation module is specifically configured to initiate the request for acquiring the table identifier to a second database table processing end through a first database table processing end based on the database identifier and the table information to acquire the table identifier returned by the second database table processing end.

In some embodiments, the client table creation module is specifically configured to associate the table identifier with the database identifier through a first document processing end in response to the table identifier sent from the first database table processing end; and send an association result to a second document processing end for the second document processing end to store the association result in the data structure corresponding to the current document.

In some embodiments, the client table creation module is specifically configured to render the database table through a first database table processing end based on the table information and the database identifier; and present the rendered database table on an interface of the current document through the first document processing end.

In some embodiments, the table information comprises at least one of information for setting a table format, or a view presentation form.

In some embodiments, the created database table has database functions comprising at least one of structured storage, Structured Query Language query, or operation on data.

The above apparatus for processing a table of a document, which is applied to a client, provided by the embodiments of the present disclosure, can execute the above method for processing a table of a document, which is applied to a client, provided by any of the embodiments of the present disclosure, and has functional modules and beneficial effects corresponding to the execution of the method.

Figure 6:
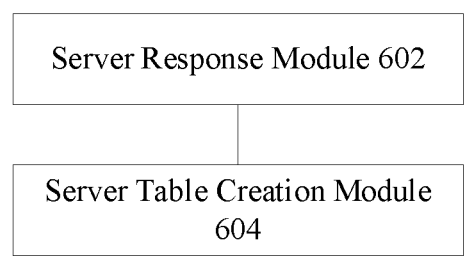
FIG. 6 is a schematic structural diagram of an apparatus for processing a table of a document, which is applied to a server, according to an embodiment of the present disclosure.

In correspondence to the above methods for processing a table of a document, the present disclosure provides an apparatus for processing a table of a document, which is applied to a server, and a schematic structural diagram of an apparatus for processing a table of a document, which is applied to a server, is shown in FIG. 6. The apparatus can be implemented by software and/or hardware, and can be generally integrated in an electronic device (such as a server) that can serve as a server, and comprises:

- a server response module 602 configured to acquire a database identifier associated with a current document in response to a table creation request initiated by a client for creating a database table in the current document; and
- a server table creation module 604 configured to return the database identifier to the client for the client to create the database table in the current document based on the database identifier and table information of the database table, wherein the table information is acquired by the client based on a table creation operation of a user for the current document.

The apparatus can directly access the database table in the document through interactions between the client and the server, and the database table is related to the database associated with the current document, which helps to further enable the table accessed in the document to have database-related functions, and effectively enhances the functionality of the table.

In some embodiments, the server response module 602 is specifically configured to: inquire whether the current document is associated with an existing database; in response to the current document being associated with the existing database, take an identifier of the existing database as the database identifier associated with the current document; and in response to the current document not being associated with the existing database, create a new database, and taking an identifier of the new database as the database identifier associated with the current document.

In some embodiments, the apparatus further comprises a server identifier returning module configured to return a table identifier to the client in response to a request for acquiring the table identifier initiated by the client based on the database identifier and the table information for the client to store the table identifier and the database identifier in association in a data structure corresponding to the current document by the client and to render and present the database table on the current document based on the table information by the client.

In some embodiments, the server response module is specifically configured to, in response to the table creation request for creating the database table in the current document initiated by a first database table processing end, acquire the database identifier associated with the current document through a second database table processing end; the server table creation module is specifically configured to: return the database identifier to a first database table processing end through the second database table processing end.

In some embodiments, the server identifier returning module is specifically configured to receive, through a second database table processing end, the request for acquiring the table identifier initiated by a first database table processing end based on the database identifier and the table information; and return the table identifier corresponding to the request for acquiring the table identifier to the first database table processing end for the first database table processing end to return the table identifier to a first document processing end.

In some embodiments, the apparatus further comprises: an associated storage module configured to receive an association result of the table identifier and the database identifier from a first document processing end through a second document processing end; and store the association result into the data structure corresponding to the current document.

The above apparatus for processing a table of a document, which is applied to a server, provided by the embodiments of the present disclosure, can execute the above method for processing a table of a document, which is applied to a server, provided by any of the embodiments of the present disclosure, and has functional modules and beneficial effects corresponding to the execution of the method.

It can be clearly understood by those skilled in the art that, for convenience and simplicity of description, the specific working process of the above-described apparatus embodiments may refer to the corresponding process in the method embodiments, and details are not described herein again.

The embodiments of the present disclosure provide an electronic device, comprising: a processor; and a memory configured to store instructions executable by a processor; the processor, configured to read the executable instructions from the memory and execute the instructions to implement any of the method for processing a table of a document, which is applied to a client, or implement any of the method for processing a table of a document, which is applied to a server. That is, the electronic device may be implemented as a client or as a server.

Figure 7:
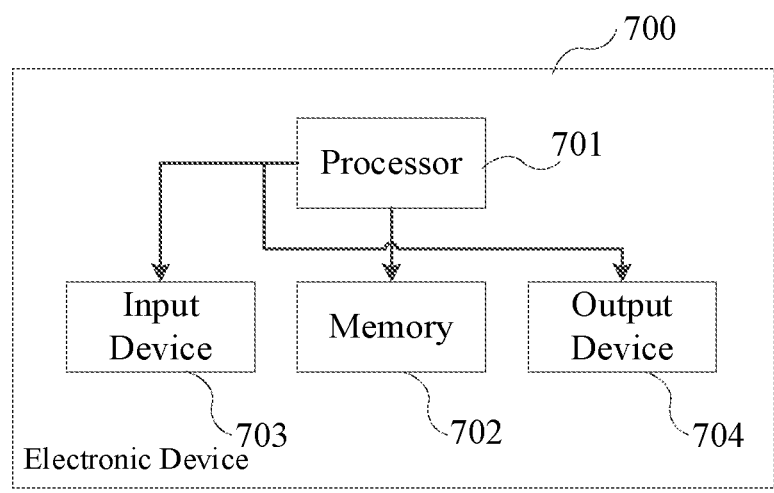
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device 700 comprises one or more processors 701 and a memory 702.

The processor 701 may be a Central Processing Unit (CPU) or other form of processing units having data processing capabilities and/or instruction execution capabilities, and may control other components in the electronic device 700 to perform desired functions.

The memory 702 may comprise one or more computer program products that may comprise various forms of computer-readable storage media, such as volatile memory and/or non-volatile memory. The volatile memory may comprise, for example, Random Access Memory (RAM) and/or cache, etc. The non-volatile memory may comprise, for example, Read Only Memory (ROM), hard disk, flash memory, etc. One or more computer program instructions may be stored on the computer-readable storage medium and executed by the processor 701 to implement the above-described methods for processing a table of a document according to the embodiments of the present disclosure and/or other desired functions. Various content such as an input signal, signal component, noise component, etc. may also be stored in the computer-readable storage medium.

In an example, the electronic device 700 may further comprise: an input device 703 and an output device 704, which are interconnected by a bus system and/or other form of connection mechanism (not shown).

The input device 703 may also comprise, for example, a keyboard, a mouse, and the like.

The output device 704 may output various information to the outside, including the determined distance information, direction information, and the like. The output device 704 may comprise, for example, a display, a speaker, a printer, as well as a communication network and its connected remote output devices.

Of course, for simplicity, only some of the components of the electronic device 700 relevant to the present disclosure are shown in FIG. 7, and components such as buses, input/output interfaces, and the like are omitted. In addition, the electronic device 700 may also comprise any other appropriate components depending on specific applications.

In addition to the above methods and apparatuses, the embodiments of the present disclosure may also be a computer program product comprising computer program instructions which, when executed by a processor, cause the processor to perform the method for processing a table of a document provided by embodiments of the present disclosure.

The computer program product may write program code for carrying out operations for the embodiments of the present disclosure in any combination of one or more programming languages, including an object oriented programming language such as Java, C++ or the like and conventional procedural programming languages such as the "C" programming language or similar programming languages. The program code may execute entirely on the user's computing device, partly on the user's device, as a stand-alone software package, partly on the user's computing device and partly on a remote computing device, or entirely on the remote computing device or the server.

Furthermore, the embodiments of the present disclosure may also be a non-transitory computer-readable storage medium having stored thereon computer program instructions when, when executed by a processor, cause the processor to perform the method for processing a table of a document provided by the embodiments of the present disclosure.

The computer-readable storage medium may take any combination of one or more readable media. The readable medium may be a readable signal medium or a readable storage medium. A readable storage medium may comprise, for example, but is not limited to, an electronic, magnetic, optical, electromagnetic, infrared, or semiconductor system, apparatus, or device, or a combination of any of the foregoing. More specific examples (a non-exhaustive list) of the readable storage medium comprise: an electrical connection having one or more wires, a portable diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The embodiments of the present disclosure further provide a computer program product comprising a computer program/instructions which, when executed by a processor, implement the method for processing a table of a document in the embodiments of the present disclosure.

It is noted that, in this document, relational terms such as "first" and "second," and the like, are used solely to distinguish one entity or action from another entity or action without necessarily requiring or implying any actual such relationship or order between such entities or actions. Also, the terms "comprise," "include" or any other variation thereof, are intended to cover a non-exclusive inclusion, such that a process, method, article, or device that comprises a list of elements does not comprise only those elements but may comprise other elements not expressly listed or inherent to such process, method, article, or device. Without further limitation, an element defined by the phrase "comprising a . . . " does not exclude the presence of other identical elements in the process, method, article, or device that comprises the element.

The above is only for the purpose of describing specific embodiments of the present disclosure, so as to enable those skilled in the art to understand or implement the present disclosure. Various modifications to these embodiments will be obvious to those skilled in the art, and the generic principles defined herein may be implemented in other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. A method for processing a table of a document, which is applied to a client, comprising:
    acquiring table information of a database table to be created and initiating, to a server, a table creation request for creating the database table in the current document in response to a table creation operation of a user for a current document; and
    in response to a database identifier associated with the current document returned by the server for the table creation request, creating the database table in the current document based on the database identifier and the table information.

2. The method according to claim 1, wherein the creating the database table in the current document based on the database identifier and the table information comprises:
    initiating a request for acquiring a table identifier to the server based on the database identifier and the table information;
    in response to the table identifier returned by the server for the request for acquiring the table identifier, storing the table identifier and the database identifier in association in a data structure corresponding to the current document; and
    rendering and displaying the database table on the current document based on the table information.

3. The method according to claim 2, wherein the initiating the request for acquiring the table identifier to the server based on the database identifier and the table information comprises:
    initiating the request for acquiring the table identifier to a second database table processing end through a first database table processing end based on the database identifier and the table information to acquire the table identifier returned by the second database table processing end.

4. The method according to claim 1, wherein the acquiring table information of a database table to be created and initiating, to a server, a table creation request for creating the database table in the current document in response to a table creation operation of a user for a current document comprises:
    acquiring the table information of the database table to be created through a first document processing end in response to the table creation operation of the user for the current document, and sending a request to a first database table processing end to acquire the database identifier associated with the current document; and
    initiating the table creation request for creating the database table in the current document to a second database table processing end through the first database table processing end to acquire the database identifier, the database identifier being returned by the second database table processing end for the table creation request and being associated with the current document.

5. The method according to claim 2, wherein the storing the table identifier and the database identifier in association in a data structure corresponding to the current document comprises:
    associating the table identifier with the database identifier through a first document processing end in response to the table identifier sent from the first database table processing end; and
    sending an association result to a second document processing end for the second document processing end to store the association result in the data structure corresponding to the current document.

6. The method according to claim 2, wherein the rendering and displaying the database table on the current document based on the table information comprises:
    rendering the database table through a first database table processing end based on the table information and the database identifier; and
    presenting the rendered database table on an interface of the current document through the first document processing end.

7. The method according to claim 1, wherein:
    the client comprises a first document processing end and a first database table processing end; and
    the server comprises a second document processing end and a second database table processing end.

8. An electronic device, comprising:
    a memory configured to store instructions executable by a processor; and
    the processor configured to read the executable instructions from the memory and execute the instructions to implement the method for processing a table of a document according to claim 7.

9. A non-transitory computer-readable storage medium having thereon stored a computer program, for executing the method for processing a table of a document according to claim 7.

10. The method according to claim 1, wherein the table information comprises at least one of information for setting a table format, or a view presentation form.

11. The method according to claim 1, wherein the created database table has database functions comprising at least one of structured storage, Structured Query Language query, or operation on data.

12. A non-transitory computer-readable storage medium having thereon stored a computer program, for executing the method for processing a table of a document according to claim 1.

13. A method for processing a table of a document, which is applied to a server, comprising:
   acquiring a database identifier associated with a current document in response to a table creation request initiated by a client for creating a database table in the current document; and
   returning the database identifier to the client for the client to create the database table in the current document based on the database identifier and table information of the database table, wherein the table information is acquired by the client based on a table creation operation of a user for the current document.

14. The method according to claim 13, wherein the acquiring the database identifier associated with the current document comprises:
   inquiring whether the current document is associated with an existing database;
   in response to the current document being associated with the existing database, taking an identifier of the existing database as the database identifier associated with the current document; and
   in response to the current document not being associated with the existing database, creating a new database, and taking an identifier of the new database as the database identifier associated with the current document.

15. The method according to claim 13, further comprising:
   returning a table identifier to the client in response to a request for acquiring the table identifier initiated by the client based on the database identifier and the table information for the client to store the table identifier and the database identifier in association in a data structure corresponding to the current document by the client and to render and present the database table on the current document based on the table information by the client.

16. The method according to claim 15, wherein the returning the table identifier to the client in response to the request for acquiring the table identifier initiated by the client based on the database identifier and the table information comprises:
   receiving, through a second database table processing end, the request for acquiring the table identifier initiated by a first database table processing end based on the database identifier and the table information; and
   returning the table identifier corresponding to the request for acquiring the table identifier to the first database table processing end for the first database table processing end to return the table identifier to a first document processing end.

17. The method according to claim 15, further comprising:
   receiving an association result of the table identifier and the database identifier from a first document processing end through a second document processing end; and
   storing the association result into the data structure corresponding to the current document.

18. The method according to claim 13, wherein:
   the acquiring the database identifier associated with the current document in response to the table creation request initiated by the client for creating the database table in the current document comprises:
      in response to the table creation request for creating the database table in the current document initiated by a first database table processing end, acquiring the database identifier associated with the current document through a second database table processing end; and
   the returning the database identifier to the client comprises:
      returning the database identifier to a first database table processing end through the second database table processing end.

19. An electronic device, comprising:
   a memory configured to store instructions executable by a processor; and
   the processor configured to read the executable instructions from the memory and execute the instructions to implement a method for processing a table of a document comprising:
   acquiring table information of a database table to be created and initiating, to a server, a table creation request for creating the database table in the current document in response to a table creation operation of a user for a current document; and
   in response to a database identifier associated with the current document returned by the server for the table creation request, creating the database table in the current document based on the database identifier and the table information.

20. The electronic device according to claim 19, wherein the processor is further configured to:
   initiate a request for acquiring a table identifier to the server based on the database identifier and the table information;
   in response to the table identifier returned by the server for the request for acquiring the table identifier, store the table identifier and the database identifier in association in a data structure corresponding to the current document; and
   render and display the database table on the current document based on the table information.

* * * * *